United States Patent [19]

Kolpek et al.

[11] 3,777,072

[45] Dec. 4, 1973

[54] EDITING PROCEDURES FOR DICTATION AND TYPING SYSTEMS

[75] Inventors: Robert A. Kolpek; Robert A. Rahenkamp; William R. Stewart, Jr., all of Lexington, Ky.

[73] Assignee: International Business Machines Corporation, Armonk, N.Y.

[22] Filed: Dec. 22, 1971

[21] Appl. No.: 210,862

[52] U.S. Cl. 179/100.2 MD, 179/100.2 S, 179/100.1 DR

[51] Int. Cl.. G11b 27/02, G11b 15/02, G11b 27/08

[58] Field of Search ........... 179/100.2 MD, 100.2 S, 179/100.1 DR, 100.2 B; 340/174.1 B, 172.5

[56] References Cited

UNITED STATES PATENTS

| | | | |
|---|---|---|---|
| 3,413,624 | 11/1968 | Murdoch et al. | 340/174.1 B |
| 3,671,683 | 6/1972 | Rahenkamp et al. | 179/100.1 DR |
| 3,674,125 | 7/1972 | Koplek | 340/174.1 R |
| 3,660,616 | 5/1972 | Davidge et al. | 179/100.2 MD |
| 3,281,803 | 10/1966 | Kleinschmidt et al. | 179/100.2 R |
| 3,668,648 | 6/1972 | Yoshikawa | 179/100.2 S |

*Primary Examiner*—Vincent P. Canney
*Assistant Examiner*—Alfred H. Eddleman
*Attorney*—D. Kendall Cooper

[57] ABSTRACT

The present invention concerns methods and apparatus for editing information and involves procedures for editing of both audio and typed (digital) information. The system incorporates a dictation machine capable of storing sentences and paragraphs in assigned areas on a record medium together with address information indicative of the preferred sequence of playback of such information. The system further includes a transcribing unit and a typing station having facilities for recording and playing back digital signals representative of typed copy and further having provision for storing address information on magnetic card media indicative of locations of sentences on the typed copy which is in the preferred sequence as actually typed. Several sequences may be followed in achieving a final version of the typed copy.

20 Claims, 4 Drawing Figures

EDITING PROCEDURES FOR DICTATION AND TYPING SYSTEMS

BACKGROUND OF INVENTION, FIELD, AND PRIOR ART

The following patent cases are intended to be incorporated by reference herein.

Prior systems involving the recording of audio information, such as sentences and paragraphs, in individual assigned storage tracks on a record medium are set forth in the following U.S. patent cases.

U.S. Pat. application Ser. No. 50,577, filed June 29, 1970 now U.S. Pat. No. 3,660,616,; with Ronald V. Davidge, et al., as inventors; entitled "Dictating and Transcribing Systems Featuring Random Sentence Arrangement with Recognition and Location of Sentences In A Preferred Sequence."

U.S. Pat. application Ser. No. 50,605, filed June 29, 1970 now U.S. Pat. No. 3,671,683, with Robert A. Rahenkamp, et al., as inventors; entitled "Sentence Oriented Dictation System Featuring Random Accessing of Dictation Segments."

U.S. Pat. application Ser. No. 50,683, filed June 29, 1970, now continued as U.S. Pat. application Ser. No. 260,343, filed June 6, 1972, with Robert A. Kolpek as inventor; entitled "Sentence Oriented Dictation System Featuring Random Accessing of Information In A Preferred Sequence Under Control of Stored Codes."

The present system includes a typing station with facilities for recording and reproducing information stored in a digital form on a magnetic record card and representative of typed copy. Prior systems of this general nature are set forth in the following cases:

U.S. Pat. No. 3,512,137, J. E. Jones, et al., inventors, entitled "Correlated Recording, Reproducing, Printing, and Composing Apparatus."

U.S. Pat. application Ser. No. 886,798, now U.S. Pat. No. 3,674,125, filed Dec. 19, 1969 as a continuation of application Ser. No. 802,700, filed Sept. 6, 1968 that in turn comprised a continuation of Pat. application Ser. No. 623,053, filed Mar. 14, 1967 with Robert A. Kolpek as inventor, and entitled "Data System with Printing, Composing, Communication and Magnetic Card Processing Facilities."

The above patent cases are all assigned to the same assignee as the present case.

The present invention distinguishes over the various art of record set forth above by combining features of both "audio", that is, dictation systems and "digital", that is, typing systems in an integrated editing system offering superior advantages in word processing operations.

SUMMARY OF THE INVENTION

The present invention is concerned with procedures for editing of information that involves the recording and playback of both audio information and typed information, that is, digital information, the procedures contemplating an integrated approach to the entire processing operation. The procedures are outlined below.

In phase 1, a dictator dictates various material that he wishes typed by utilizing a Sentence Oriented Dictation System (SODS) wherein individual sentences are stored in sentence cells on a magnetic recording belt. Systems of this nature are set forth in the Davidge, et al. and Rahenkamp, et al. cases; and the 1970 (continued, 1970) Kolpek case, referred to above. Using such systems, it is contemplated that sentences are stored in individual tracks (cells) on the belt, but that such sentences may be accessed in any desired order regardless of the sequence they were originally recorded on the belt by reference to a "preferred" sequence stored in a memory. The same principles apply to the storage and rearrangement of paragraphs. As taught in the Davidge case, the "preferred" sequence information stored in the memory of the SODS unit is read out and recorded in a special area on the belt for later use by the typist in recognizing the proper sequence of typing of the information.

Upon completion of dictation of the information on the belt together with the recording of the preferred sequence information, the dictator gives the belt to the typist for a phase 2 operation. This involves loading the belt in a transcribing unit, storing the original sequence from the belt into a memory in the transcribing unit and thereafter typing a draft in accordance with the preferred sequence. That is, the typist listens to the audio information which is accessed automatically by the transcribing unit in accordance with the preferred sequence. The typist prepares a draft using a typewriter/-magnetic card unit. At the end of each line of typing, the typewriter automatically moves to the right hand margin and types an identifying number indicative of the sentences appearing in each line. As typing proceeds, a magnetic record card medium is recorded upon digitally representative of the actual typed information on the typed copy. Systems of this general nature having facilities for recording and reproducing information on a magnetic record card medium in a digital sense are set forth in the Jones, et al patent and the 1967 Kolpek U.S. Pat. No. 3,674,125. The present system contemplates the storing of preferred sequence information in a digital form on the magnetic record card medium prior to its ejection from the transcribing unit. This preferred sequence represents the typed copy as actually typed and is set forth in the form of a starting location for each sentence appearing on the typed copy.

Following phase 2, the typist furnishes the typed copy and the original belt to the dictator for editing purposes.

The dictator loads the belt back into the SODS dictation unit. The keyboard of the SODS dictation unit displays the paragraph and sentence numbers that appear on the typed copy. The dictator observes the typed copy and if he has a simple correction, depresses a sentence number and a correction button which marks a bit in the SODS memory in a special location. The dictator may insert new sentences by dictating them onto the belt and if so marks a special location in memory. Sentences and paragraphs may be rearranged during this editing procedure as during original dictation efforts. Upon completion of the editing, the new preferred sequence of the information is again recorded onto the magnetic belt and the belt returned to the typist.

During the 4th phase, the typist again loads the belt into the transcribing unit and the preferred sequence information from the belt is loaded into memory. The originally recorded magnetic card medium is positioned at station 1 of the typing/magnetic card unit and the two tracks on the record card medium storing the preferred sequence as actually typed are also stored in memory. At this point, a very significant procedure takes place in that information from the magnetic record card is played back under control of the preferred sequence read from the audio belt, now stored in memory. Thereupon, a new magnetic card is generated at the second station of the typing unit. When the special marks stored in memory are recognized, the machine stops typing, the typist inspects the edited hard copy returned by the dictator and makes any necessary changes. Also, if rearrangement of sentences is necessary, the typing unit stops typing and an indicating tube displays the number of the particular card that has to be placed in the card processing unit to get the proper "out of sequence" information. Following that, the machine displays the next card that should be used by the typist to proceed with generation of information for the new card at the second station. Upon completion of the typing of the second typed copy which may be in final form, the typist returns the belt to the dictator with the new preferred sequence stored on the belt for his further editing if required.

OBJECTS

The primary object of the present invention is to provide apparatus that incorporates both audio and digital capabilities with an intermixing of procedures to achieve a highly efficient processing of information stored in both forms.

Another object of the present invention is to provide a system that is capable of inter-relating information stored in blocks, such as sentences and paragraphs along with preferred sequence information that is derived in some cases from a predominately audio device and in other cases from a predominately digital device.

Also, an object of the present invention is to provide facilities insuring simplified editing of typed copy prepared by a typist in accordance with originally stored audio information.

A still further object of the present invention is to provide a system of this general nature that is capable of processing information stored in both audio and digital form with the information stored in a preferred form, such as in sentence or paragraph form, and having facilities for correlating preferred sequences of both stored information and typed information.

The foregoing and other objects, features, and advantages of the invention will be apparent from the following more particular description of the preferred embodiment of the invention as illustrated in the accompanying drawings.

DRAWINGS

GENERAL DESCRIPTION

Figures 1, 2:
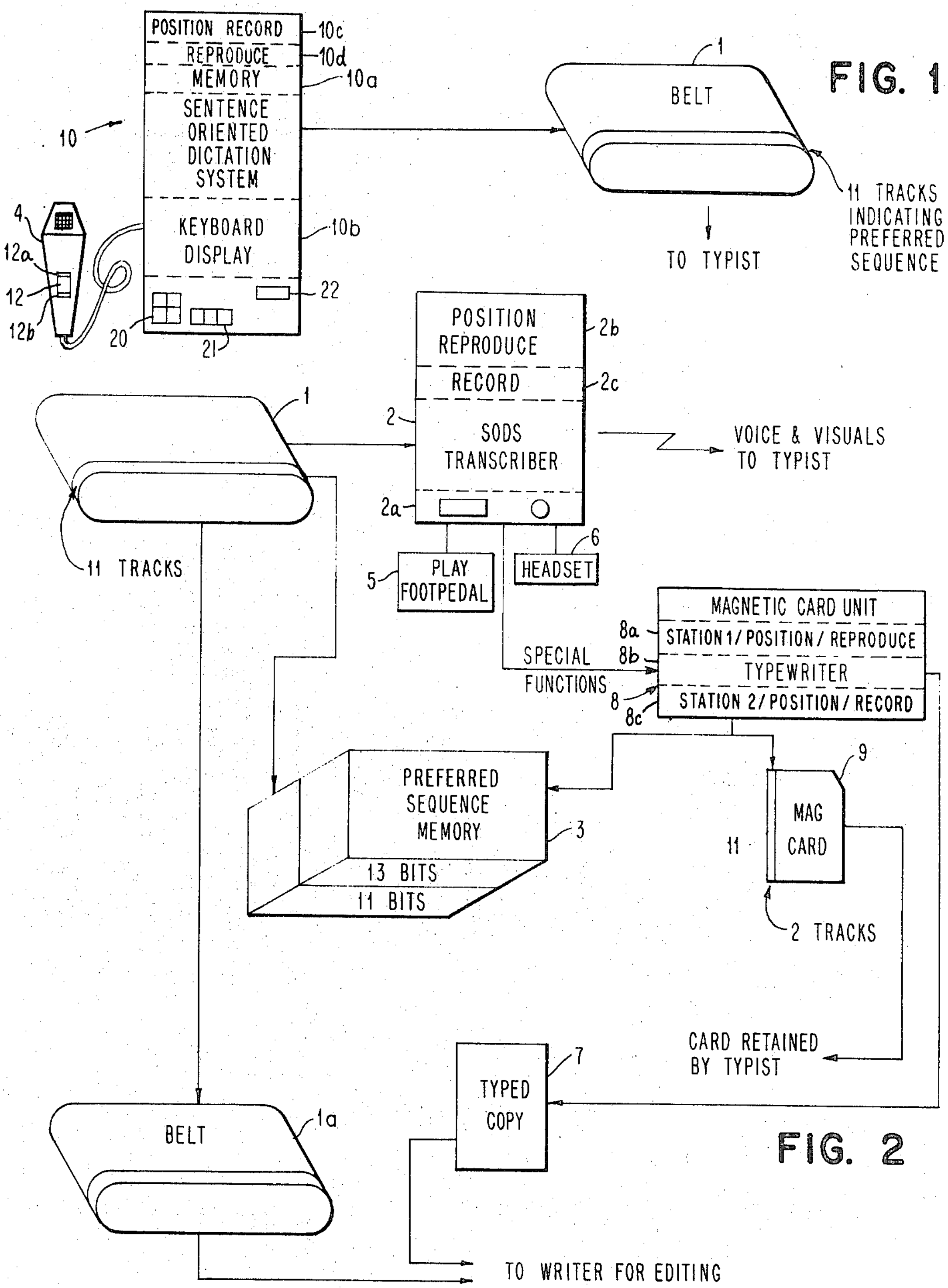
FIG. 1 illustrates a Sentence Oriented Dictation System (SODS) for storing audio information in a form for convenient accessing, such as in sentences and paragraphs, together with information indicative of the preferred sequence of playback of such audio information.
FIG. 2 illustrates a secretarial station comprising a Sentence Oriented Dictation System (SODS) transcriber unit and a magnetic card unit comprising a typewriter and two recording/playback stations, together with a memory facility.

The first phase of the operation of this system is illustrated in FIG. 1. This phase consists of the author dictating a document on a belt 1 as described in the Davidge, et al., application that shows a Sentence Oriented Dictating System 10, (SODS), controlled by a microphone unit 4. Unit 4 has a control bar 12 with portion 12*a* actuating system 10 to record audio segments on belt 1 and portion 12*b* causing storage of preferred sequence indicia in memory 102. Keyboard/display portion 10*b* includes paragraph buttons 20 and sentence buttons 21 that are selectively lighted to display particular paragraphs and sentences being worked with and a terminate button 22 that is actuated to record audio sequence indicia on belt from memory 10*a*. Unit 10 also has position/record means 10*c* for positioning belt 1 for recording operations, and reproduce means 10*d* for playback of information on belt 1. The result of this dictation is a belt or belts each containing, in eleven assigned tracks, the preferred sequence of the sentences which is the order in which they will be played out to the typist. The Davidge application describes 10 tracks. The extra track is used to mark every point where the typist is to make a correction or insertion. Having completed the belts in the SODS unit 10, the author sends them to the typist in order to obtain the first draft copy.

The second phase illustrated by FIG. 2 is the typing of the rough draft hard copy. The operator takes the belt 1 from the author and places it into the SODS transcriber unit 2. Unit 2 has a control keyboard 2*a*, belt positioning and reproducing facilities 2*b* and belt recording facilities 2*c*. When the belt is loaded into the transcriber, the preferred sequence stored in the eleven tracks on the belt is placed in the preferred sequence memory 3. The operator, in pressing the play foot pedal 5 hears the document in its preferred sequence through headset 6 and types the document 7 in this sequence. The system includes a two-station magnetic card recording/playback facility 8 as set forth in the 1967 Kolpek case, in this case having a Station 1, designated 8*a*, having card positioning and playback facilities and Station 2, designated 8*c*, having card positioning and recording facilities. Certain special keybuttons such as "End-of-Sentence" cause the typewriter 8*b* automatically to print a period, space and go into upper case for the beginning of the next sentence.

At the end of typing of each line when the operator Carrier Returns, typewriter 8*b* tabulates to the right hand margin and automatically prints an identifying number or numbers of any sentences on the line, and then Carrier Returns to the left hand margin in readiness for the next line of typing. Also, at the end of each paragraph, the typewriter automatically prints a period, and Carrier Returns twice and tabs if the first sentence is to be indented. As the typist types each sentence, the location of the start of that sentence is placed in the preferred sequence memory 3. This is done so that a written record of the location of the beginning of each sentence is maintained.

Memory 3 has a plurality of storage cells corresponding in number to the number of audio tracks on belt 1. Stored in each cell is the sentence and paragraph number of the audio information stored on the belt. Also stored in each cell is the track and character number which is representative of the starting location of that particular sentence and/or paragraph as typed on the typed copy 7. Thus, as the copy 7 is prepared by the typist, each audio segment is automatically correlated with a typed sentence corresponding to the audio segment.

When the operator completes a page before the magnetic card 9 is ejected, the starting point of each sentence on the card in sequence is written in two assigned tracks in portion 11 on the magnetic card 9, by control from keyboard 2*a*. When all the starting positions are completed, the card is ejected. After all of the audio signals on a particular belt 1 have been transcribed, the belt is automatically erased and the new preferred sequence which is the actual typed sequence on the magnetic card (or cards) is rewritten into 10 of the 11 tracks on the belt, also under control of keyboard 2*a*. The belt 1*a* is then ejected from the transcriber 2 and, given back to the author of the document with the typed copy 7 for editing. The magnetic card (or cards) 9 are retained by the typist.

Figure 3:
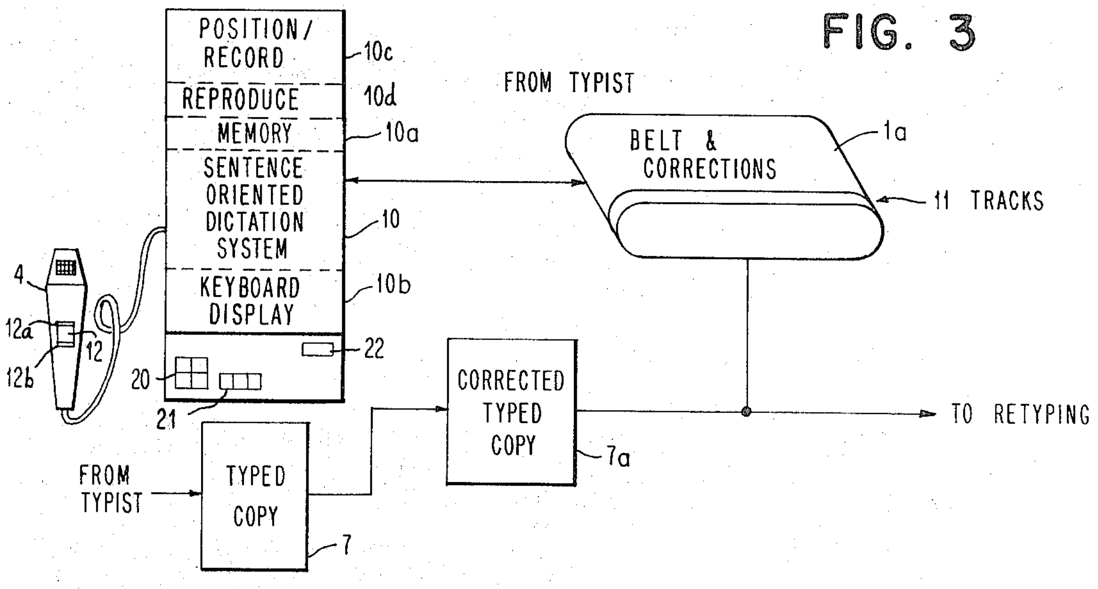
FIG. 3 illustrates editing procedures followed by the dictator upon return of typed copy from the typist, again using the Sentence Oriented Dictation System (SODS) described in conjunction with FIG. 1.

The third phase of the operation illustrated in FIG. 3 is the editing of the typed copy 7 by the author. The author places belt 1*a* with the typed copy sequences recorded in the ten preferred sequence tracks into the SODS unit 10. Next, he views the copy 7 having sentence numbers thereon and the SODS keyboard 10*b* gives a visual indication of the number of paragraphs and sentences in those paragraphs on the pages before him. The author uses an editing pencil to mark simple corrections on copy 7. Each time he makes such a correction, he simply identifies the sentence in which the correction is to be made on the SODS keyboard 12 and presses a Correction button. When this is done an eleventh bit is marked in the SODS memory 10*a* which corresponds to the 11th track on the belt associated with that sentence location. When a sentence is to be inserted in the typed document 7 the author locates the point at which the sentence is to be inserted on the SODS keyboard and dictates the sentence at this point. This also marks the eleventh bit in SODS memory 10*a*. Paragraphs to be inserted follow the same exact procedure as sentences.

Sentences and paragraphs may also be rearranged in the same manner as the dictated audio sentences are rearranged during any initial SODS dictation without any further instructions to the operator. In the case of rearrangement, the 11th track is not marked since during retranscription the operator does not have to be in attendance for this unless the rearrangement is between cards. In this editing situation, the author is free to make any sort of notes on the hard copy. If it's easier for him to note an instruction than to dictate he should do so. Either way, the operator will be alerted to this situation. When the editing is complete, the author will return the belt 1*a* and corrected typed copy 7*a* to the typist.

Figure 4:
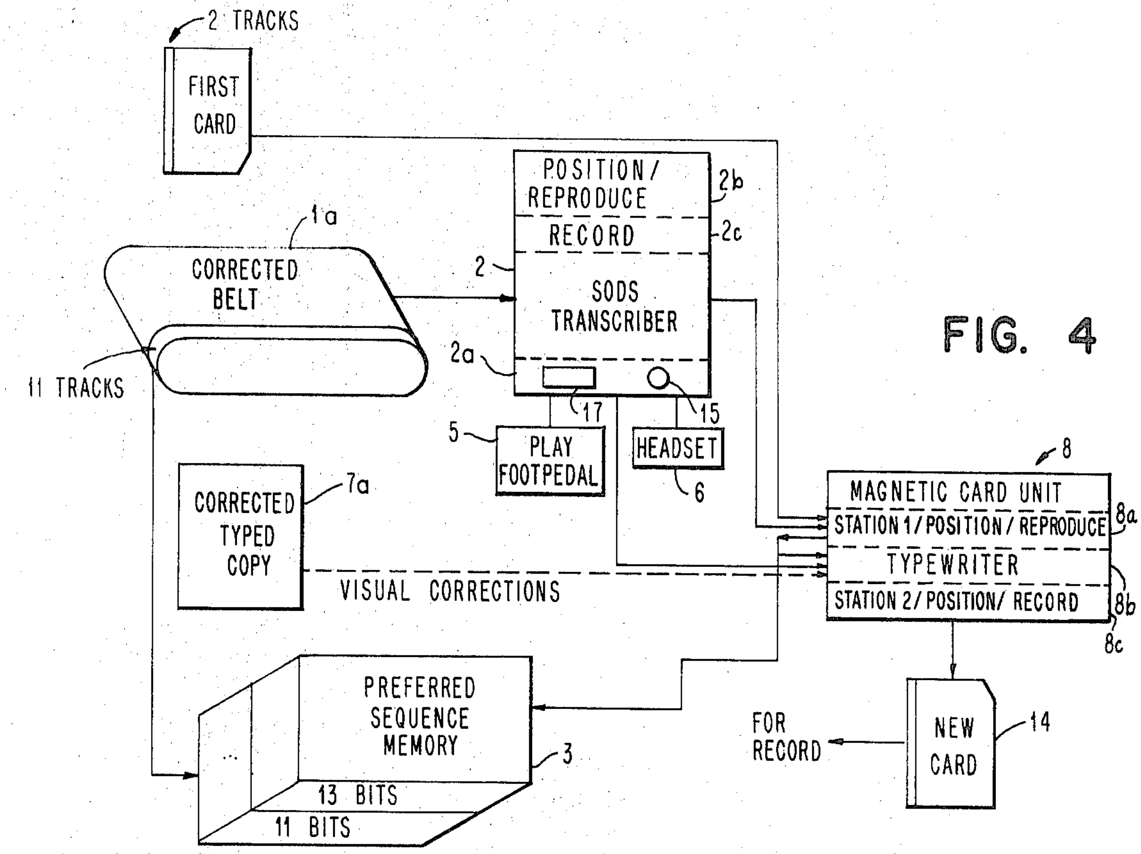
FIG. 4 illustrates final phases of the editing procedures involving a first recorded card and a corrected belt received from the dictator with provision for preparation of a new magnetic record card member by the magnetic card unit.

The fourth phase is illustrated in FIG. 4, and involves the completion of the first round of editing. In this phase, the corrected belt 1*a* is first placed into the SODS transcriber 2. When the corrected belt is loaded into the SODS transcriber 2, the 11 tracks are loaded again into the preferred sequence memory 3. After this, the operator places the first magnetic card into the first station of the two-station Magnetic Card machine 8. The Magnetic Card unit station 1 designated 8*a* automatically reads the information on the two preferred sequence tracks into their associated positions in preferred sequence memory 3. The operator then places a new sheet of paper in the typewriter 8*b* and starts the playback operation. The sequence of playback from the first magnetic card will be under control of the preferred sequence memory which received its information from the correction belt. This in essence, causes typewriter 8*b* to play out the document in the sequence indicated by the author during the editing or revision phase three.

At the same time that typewriter 8*b* is typing the document in its new preferred sequence, a new magnetic card 14 is being generated in the second station 8*c* of the two-station Magnetic Card unit 8. In the play out of the preferred sequence, when an eleventh bit is found associated with any sentence, the Magnetic Card made at 8*a* automatically stops. The operator immediately views a control panel 2*a* on the SODS transcriber 2 and determines the sentence and paragraph at which the machine has stopped. The typist then views the copy 7*a* and performs the correction as described on copy 7*a*. In the case of an insertion, a light 15 will light which will indicate to the operator that she should press foot pedal 6 and key the insertion directly into the typewriter and on to the new magnetic card 14. In the case of rearrangements, the typewriter will normally not stop unless the information to be typed is not located on the magnetic card which has been introduced into the two-station Magnetic Card unit. In this case, the machine will stop and a visual digital indicator tube 17 will indicate which card should be next placed into the Magnetic Card unit station 8*a* by the operator in order to capture the out-of-sequence information. After the out-of-sequence information has been played back to the typewriter, the Magnetic Card unit will again stop and indicate by tube 17 the next card to be placed in the machine.

The edited hard copy is now returned to the author along with an erased belt, with a new preferred sequence in the 11 tracks on the belt. The new magnetic cards are again retained by the typist for future use.

In this manner, the editing may go through several sequences of the phases described in order to finally get the required ultimate document desired.

While the invention has been particularly shown and described with reference to a preferred embodiment, it will be understood by those skilled in the art that various changes in form and detail may be made without departing from the spirit and scope of the invention.

What is claimed is:

1. A method of recording, reproducing and editing audio and digital information using record media comprising the steps of:

1. recording a series of audio segments on a first record medium;
2. recording on said first record medium audio sequence indicia indicative of a preferred sequence of accessing of said audio segments;
3. reproducing said audio segments in said preferred sequence;
4. typing digital segments on a typed copy in accordance with said reproduced audio segments; and 5. recording on a second record medium a series of digital segments representative of said typed copy.

2. The method of claim 1 further comprising the step of:

6. recording on said second record medium a first group of digital sequence indicia indicative of the actual sequence of digital segments typed on said typed copy.

3. The method of claim 1 further comprising the step of:

6. recording on said first record medium a first group of digital sequence indicia indicative of the actual sequence of digital segments typed on said typed copy.

4. The method of claim 3 further comprising the steps of:

7. storing said first group of digital sequence indicia; and 8. displaying said first group of digital sequence indicia for guidance during editing of said typed copy.

5. The method of claim 4 further comprising the steps of:

9. recording on said first record medium a second group of digital sequence indicia indicative of a different preferred sequence of typing of digital segments on said typed copy.

6. The method of claim 3 further comprising the steps of:

7. revising said first group of digital sequence indicia; and 8. recording said revised indicia as a second group of digital sequence indicia on said first record medium.

7. The method of claim 6 further comprising the steps of:

9. providing correction indicia indicative of digital segments requiring correction; and 10. recording said correction indicia on said first record medium.

8. The method of claim 7 further comprising the steps of:

11. reproducing said correction indicia from said first record medium;

12. storing said correction indicia; and 13. reproducing digital segments from said second record medium under control of said correction indicia.

9. The method of claim 6 further comprising the steps of:

9. reproducing said second group of digital sequence indicia;

10. storing said second group of digital sequence indicia; and 11. reproducing digital segments from said second record medium under control of said second group of digital sequence indicia to produce a subsequently typed copy.

10. The method of claim 9 further comprising the steps of:

12. preparing a third record medium in accordance with the sequence of reproduction of said digital segments.

11. The method of claim 9 wherein information segments are stored in a plurality of record media and further comprising the steps of:

12. providing visible indications of a preferred sequence of use of said record media for guidance of a typist during reproducing operations.

12. The method of claim 9 further comprising the steps of:

12. erasing audio segments from said first record medium; and 13. recording on said first record medium a third group of digital sequence indicia indicative of the actual sequence of typing of said subsequently typed copy.

13. The method of claim 1 further comprising the steps of:

6. recording on said first record medium a first group of digital sequence indicia indicative of the actual sequence of digital segments typed on said typed copy.

7. recording on said second record medium said first group of digital sequence indicia indicative of the actual sequence of digital segments typed on said typed copy.

14. The method of claim 13 further comprising the steps of:

8. revising said first group of digital sequence indicia; and 9. recording said revised indicia as a second group of digital sequence indicia on said first record medium.

15. The method of claim 14 further comprising the steps of:

10. reproducing said first group of digital sequence indicia from said second record medium;

11. storing said first group of digital sequence indicia;

12. reproducing said second group of digital sequence indicia from said first record medium;

13. storing said second group of digital sequence indicia; and 14. reproducing digital segments from said second record medium under control of both said first and second groups of digital sequence indicia to produce a subsequently typed copy.

16. Apparatus for recording, reproducing and editing audio and digital information using record media comprising:

first positioning means for positioning a first record medium for processing;

first recording means;

means for actuating said first recording means to record a series of audio segments on said first record medium means for actuating said first recording means to record on said first record medium audio sequence indicia indicative of a preferred sequence of accessing of said audio segments;

first reproducing means;

means for actuating said first reproducing means to reproduce said audio segments in said preferred sequence;

typing means for typing digital segments on a typed copy in accordance with said reproduced audio segments;

second positioning means for positioning a second record medium for processing;

second recording means;

means for actuating said second recording means to record on said second record medium a series of digital segments representative of said typed copy.

17. The apparatus of claim 16 further comprising:

third recording means;

means for actuating said third recording means to record on said first record medium a first group of digital sequence indicia indicative of the actual sequence of digital segments typed on said typed copy.

18. The apparatus of claim 17 further comprising:

means for revising said first group of digital sequence indicia on said first record medium; and means for actuating said first recording means to record said revised indicia as a second group of digital sequence indicia on said first record medium.

19. The apparatus of claim 18, further comprising:

means for actuating said first reproducing means to reproduce said second group of digital sequence indicia;

means for storing said second group of digital sequence indicia;

second reproducing means;

and means for actuating said second reproducing means to subsequently reproduce digital segments from said second record medium under control of said second group of digital sequence indicia in order for a typist to produce a subsequently typed copy on said typing means.

20. The method of claim 19 further comprising:

third positioning means for positioning a third record medium for procssing;

third recording means; and means for actuating said third recording means to record a third record medium in accordance with the sequence of reproduction of said subsequently reproduced digital segments.

* * * * *